No. 696,531. Patented Apr. 1, 1902.
J. M. AKERS.
PNEUMATIC CONVEYER.
(Application filed June 1, 1901.)
(No Model.) 2 Sheets—Sheet 1.
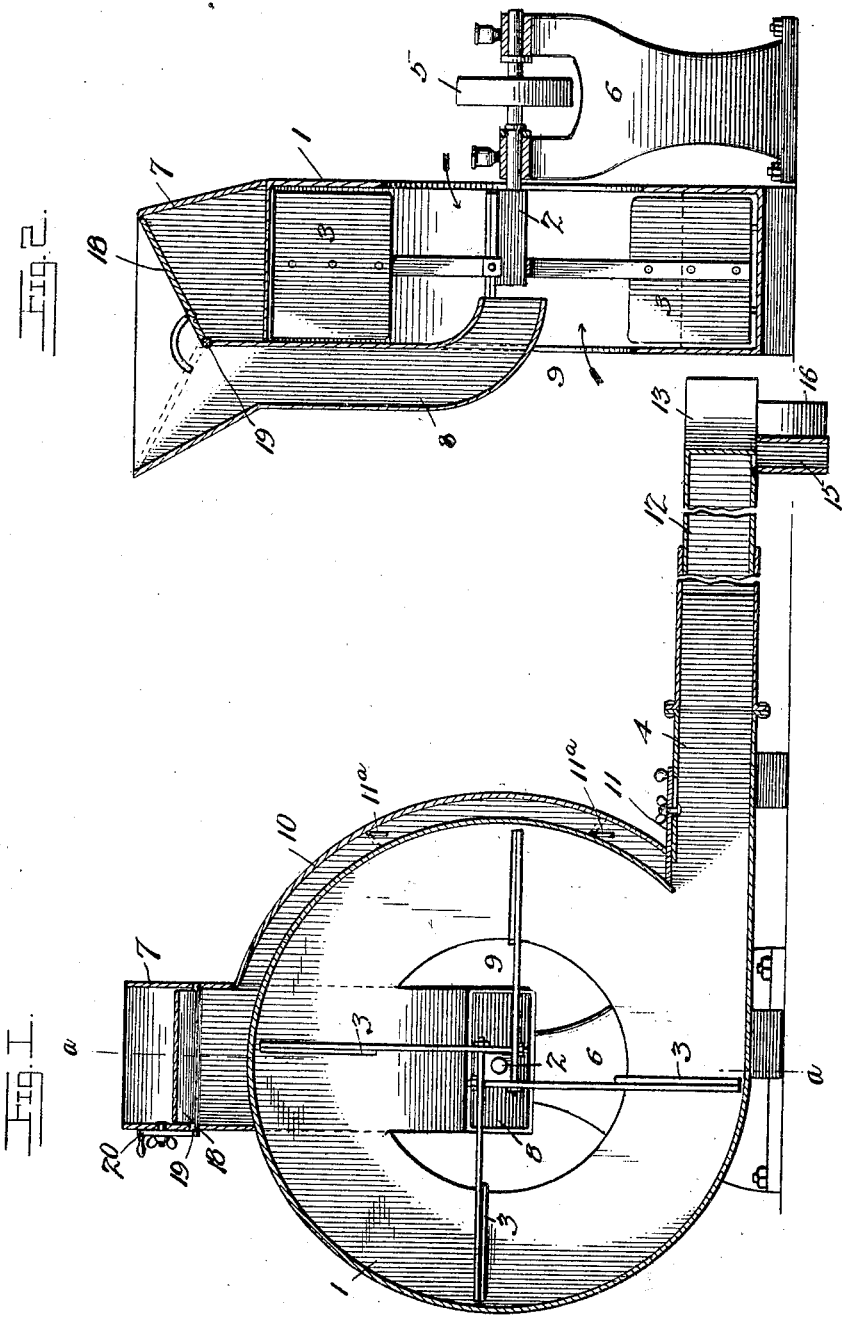

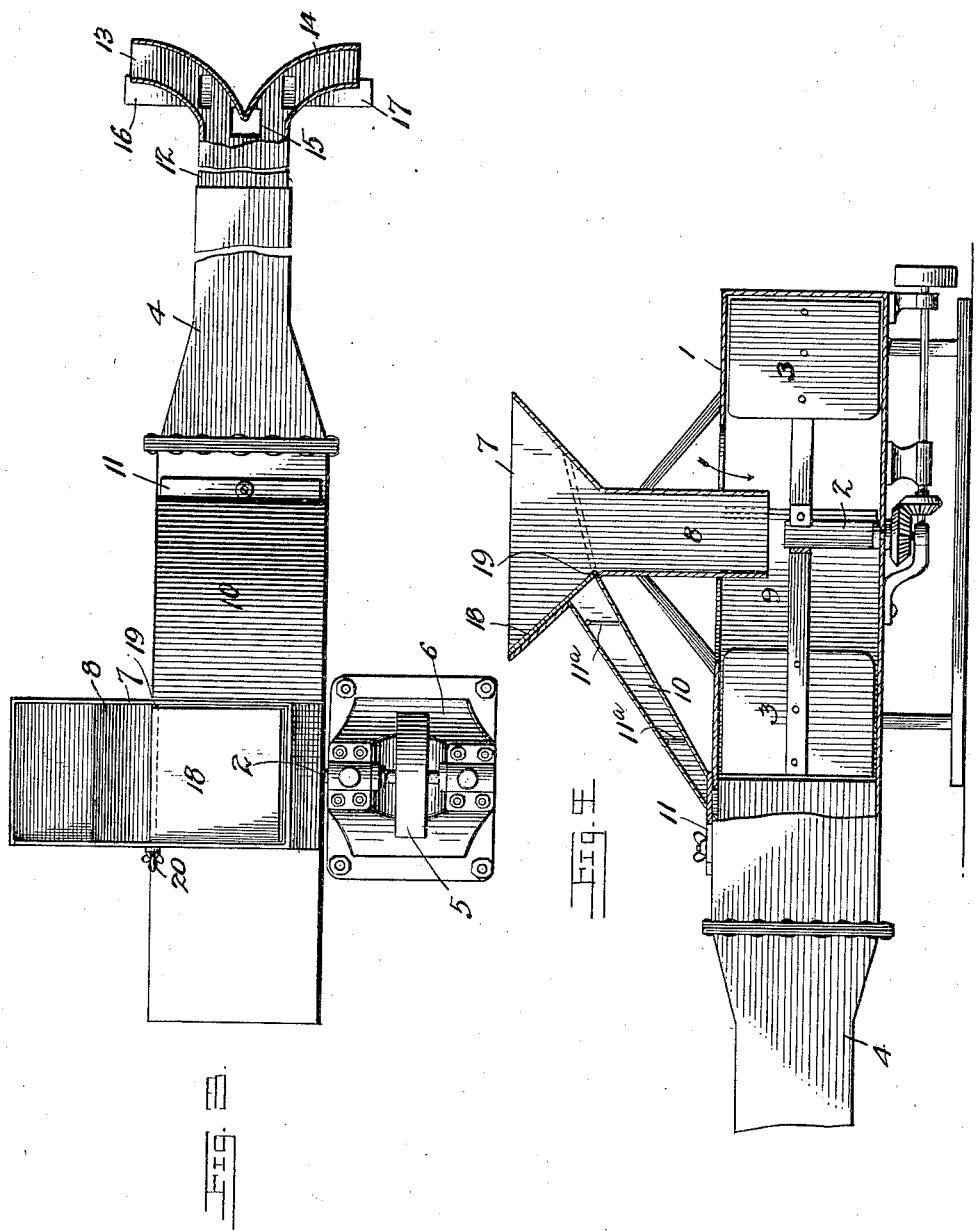

UNITED STATES PATENT OFFICE.

JAMES MILES AKERS, OF GAYS, ILLINOIS.

PNEUMATIC CONVEYER.

SPECIFICATION forming part of Letters Patent No. 696,531, dated April 1, 1902.

Application filed June 1, 1901. Serial No. 62,746. (No model.)

*To all whom it may concern:*

Be it known that I, JAMES MILES AKERS, a citizen of the United States, residing at Gays, in the county of Moultrie and State of Illinois, have invented a new and useful Pneumatic Conveyer, of which the following is a specification.

This invention relates to devices for transmitting grain by pneumatic power; and it consists in a fan around and through which the grain is conducted and subjected to the influence of the air-blast and carried forward by the force of the said air-blast to the point of discharge and the lighter particles of the dust and chaff removed during its progress.

The invention further consists in the construction, combination, and arrangement of parts whereby the various results are produced, as hereinafter shown and described, and specifically pointed out in the claims.

In the drawings illustrative of the invention, Figure 1 is a longitudinal sectional side elevation. Fig. 2 is a transverse section on the line *a a* of Fig. 1. Fig. 3 is a plan view. Fig. 4 is a longitudinal sectional elevation illustrating a modification in the construction.

In this invention is comprised a blast-fan, a hopper or other means for feeding the material to the fan, an independent chute from the hopper to the interior of the fan, an independent chute connecting the hopper and the discharge from the fan, and a series of diverging outlets at the extremity of the discharge from the fan, whereby the grain is capable of being carried through or around the fan and divided into a series of streams at the discharge end and means afforded for separating out the lighter particles of dust, chaff, and other foreign matter.

The fan employed may be of any suitable construction; but for the purpose of illustration I have shown an ordinary structure comprising a fan-casing 1, fan-shaft 2, fan-blades 3, and discharge-spout 4, the shaft 2 adapted to be driven through a pulley 5, supported upon a standard 6.

Supported at any suitable point above the fan-casing is a hopper 7, from which a chute 8 leads downward and is turned inward through the eye 9 of the fan. Another chute 10 also leads from the hopper 7 and is carried around the outside of the fan-casing and is conducted into the top of the discharge-spout 4 close up to the fan-casing, as shown.

A shut-off valve 11 is shown arranged between the chute 10 and the spout 4 to shut off the air-currents when required.

Within the chute 10 at intervals are arranged small valves 11ª, which serve to resist any tendency of air-currents to flow upward through the chute 10, but which will readily yield to any currents moving downward.

The discharge-spout 4 may be of any desired length and will be provided with a slidable extension 12, by which its length may be varied.

The extremity of the extension 12 will be formed diverging, as at 13 14, the ends of the diverging parts forming the outlets from the fan-casing.

Leading downward from the end of the extension 12 is a spout 15, and leading off at downwardly-trending angles from each side are small spouts 16 17.

Within the hopper 7 is arranged a valve 18, pivotally mounted at 19 and adapted to conduct all the contents of the hopper 7 into either of the chutes 8 or 10, so that all the material may be carried through either one of the chutes. The valve 18 is shown provided with a lever 20 outside of the hopper by which it may be actuated.

The device is intended more particularly for loading grain into railway-cars, but may be employed in other localities, if required. When employed to load railway-cars, the fan portion of the apparatus will be erected upon a suitable platform or within a warehouse or other suitable structure, and the spouts 4 12 project through the car-door above the grain-door near the roof and as near the center of the car as possible. Then if the grain to be fed to the car is wheat, corn, or other grain which is comparatively friable the valve 18 is turned to the left, so as to close the inlet to the conduit 8 and cause all the grain to pass to the spout 4 through the chute 10. As the grain falls into the spout 4 it is caught by the air-blast from the fan and carried forward into the extension 12, the pressure of the air causing the grain to be driven forcibly through all of the outlets, the larger laterally-curving branches 13 14 causing portions of the grain to be thrown to the ends of the car and the smaller downwardly and outwardly trending branches 16 17 causing a portion to be thrown to each side of the center, intermediate of the ends, and the downwardly-trending central branch 15 causing the remainder of the grain to be thrown to the center of the car. By this means the grain is distributed uniformly to the whole interior of the car and requires no manual labor whatever to "trim" the grain in the car. In passing through the grain the air-blasts detach the particles of dust and lighter particles of chaff and other light foreign matter. The strong air-currents escaping with the grain exert a continuous steady force and passing over the grain prevent settling of the dust and carry it all out through the open doorways of the car. If the air-blast be continued for a sufficient length of time after the car is loaded and the grain flow shut off, every particle of the floating dust will be removed from the car. The apparatus is therefore entirely automatic and dispenses entirely with the necessity for manual labor in loading the cars and in cleaning the grain.

By properly proportioning the outlets to the spouts 4 12 the grain can be distributed uniformly through the whole interior of the car. The air-blasts also perform an important function by cooling heated grain, which is a very important consideration.

The tubes 4 12 may elevate at an angle, if required, but the results would be the same.

The apparatus thus serves the double purpose of a means for loading the grain into the cars and also as a very efficient and rapid grain-cleaner.

If the grain to be loaded into the car be oats or other grain which would be benefited by the rough abrasive action of the fan-blades 3, the valves 18 will be turned to the right, so that all of the grain will pass through the chute 8 into the fan-casing and be therein subjected to the action of the fan-blades in addition to the air-blasts and driven out through the spouts 4 and 12 in the same manner as before described.

When the chute 8 is employed, the valve 11 will be closed to prevent any divergence of the air-currents upward into the conduit 8.

The conveyer action on the grain is the same in both arrangements.

The check-valves 11ª perform an important function, as they effectually prevent any back drafts upward through the chute 8 when the grain is running light or when the chute is empty for any reason during the operations.

The apparatus may be constructed with any required capacity and of any suitable material.

The proportions may be varied to any required extent to suit different conditions or qualities of grain and to adapt the apparatus to the various uses for which it may be employed.

In Fig. 4 is shown a modification in the construction consisting in arranging the fan upon its side or with the fan-blades traveling in a horizontal plane and suspending the hopper 7 above the fan-casing with the chute 8 leading directly downward into the "eye" of the fan and the chute 10 leading at an angle into the discharge-spout 4 at its point of juncture with the fan-casing, as shown. The operation and results produced, however, are precisely the same in all the modifications.

What I claim as new is—

1. In a device of the class described, a fan, a discharge-chute leading from said fan, a feed-hopper, a chute leading from said hopper into the eye or inlet of said fan, a chute leading from said hopper into the discharge from said fan, and means whereby the material fed into said hopper may be conducted into either of said chutes, substantially as described.

2. In a device of the class described, a fan, a discharge-chute leading from said fan, a feed-hopper, a chute leading from said hopper into the eye or inlet of said fan, a chute leading from said hopper into the discharge from said fan, and a valve within said hopper and adapted to alternately close the inlets to said chutes, whereby the material may be conducted into either of said chutes, substantially as described.

3. In a pneumatic grain-conveyer, a fan-casing, a revoluble fan therein, a chute leading to the interior of said casing through the air-intake thereof, a chute leading from said first-mentioned chute to the blast-discharge of said casing, and means to cut off the passage of material through either of said chutes, substantially as described.

4. In a pneumatic grain-conveyer, a closed chute, means for inducing artificial air-currents through said chute, laterally, and downwardly-diverging opening branches at the outlet end of said chute whereby the grain is uniformly distributed laterally and downwardly from the discharge end of said chute, substantially as described.

5. In a pneumatic grain-conveyer, a fan-casing, a revoluble fan therein, a chute leading to the interior of said casing, and a chute leading from said first-mentioned chute to the blast-discharge of said casing, one of said chutes having check-valves for the purpose set forth, substantially as described.

6. In a pneumatic grain-conveyer, a fan-casing having a discharge-chute and an air-intake, a revoluble fan in said casing, a chute 8 leading to said casing, a chute 10 leading from chute 8 to said discharge-chute, and means to cut off the passage of material through either of said chutes 8, 10, substantially as described.

7. In a pneumatic grain-conveyer, an inclosed chute through which induced air-currents are caused to pass, an extension-chute slidably disposed with relation to said first-mentioned chute, and with lateral branches at its discharge end and downwardly-opening branches near said lateral branches, substantially as described.

8. In a pneumatic grain-conveyer, an inclosed conveyer-chute through which induced air-currents are caused to pass, laterally-curving branches at the outlet end of said conveyer-chute, a centrally-disposed downwardly-projecting chute at the discharge end of said conveyer-chute and downwardly and laterally and reversely projecting chutes at the discharge end of said conveyer-chute, whereby means are provided for the lateral discharge of the air-currents, and the lateral and downward discharge of the material carried through the said conveyer-chute, substantially as described.

In testimony that I claim the foregoing as my own I have hereto affixed my signature in the presence of two witnesses.

JAMES MILES AKERS.

Witnesses:
  J. P. BABB,
  H. L. HARRISON.